US012285957B2

(12) United States Patent
Ishigai

(10) Patent No.: US 12,285,957 B2
(45) Date of Patent: Apr. 29, 2025

(54) INKJET RECORDING APPARATUS AND PROGRAM

(71) Applicant: Konica Minolta, Inc., Tokyo (JP)

(72) Inventor: Takuya Ishigai, Hino (JP)

(73) Assignee: Konica Minolta, Inc., Tokyo (JP)

( * ) Notice: Subject to any disclaimer, the term of this patent is extended or adjusted under 35 U.S.C. 154(b) by 170 days.

(21) Appl. No.: 18/178,991

(22) Filed: Mar. 6, 2023

(65) Prior Publication Data

US 2023/0302816 A1 Sep. 28, 2023

(30) Foreign Application Priority Data

Mar. 25, 2022 (JP) ................................ 2022-050867

(51) Int. Cl.

*B41J 2/21* (2006.01)
*B41J 25/06* (2006.01)
*B41J 29/393* (2006.01)

(52) U.S. Cl.

CPC ............... *B41J 2/211* (2013.01); *B41J 25/06* (2013.01); *B41J 29/393* (2013.01)

(58) Field of Classification Search

CPC ........... B41J 2/211; B41J 25/06; B41J 29/393
See application file for complete search history.

(56) References Cited

U.S. PATENT DOCUMENTS

2023/0065145 A1* 3/2023 Ishigai ................. B41J 2/16541

FOREIGN PATENT DOCUMENTS

| | | | |
|---|---|---|---|
| JP | H 8-72234 | 3/1996 | |
| JP | 2007-39078 | 2/2007 | |
| JP | 2012200975 A * | 10/2012 | |
| JP | 5736886 B2 * | 6/2015 | |
| WO | WO-2023008167 A1 * | 2/2023 | ................ B41J 2/01 |

* cited by examiner

*Primary Examiner* — Sharon Polk
(74) *Attorney, Agent, or Firm* — BakerHostetler

(57) ABSTRACT

An inkjet recording apparatus of a scanning type includes: a treatment liquid head that ejects a treatment liquid having a flocculation effect on a coloring material ink and a coloring material; and an ink head that ejects the coloring material ink in a single carriage, wherein the ink head does not pass through a treatment liquid discharging part after discharging the treatment liquid in a same scan.

12 Claims, 12 Drawing Sheets

INKJET RECORDING APPARATUS AND PROGRAM

This application claims priority to Japanese Patent Application No. 2022-050867, filed on Mar. 25, 2022, the entire disclosure of which is incorporated herein by reference in its entirety.

BACKGROUND

Technological Field

The present invention relates to an inkjet recording apparatus and a program.

Description of the Related Art

Conventionally, in an inkjet recording apparatus, discharging (flushing) of ink is performed in a printing part and a non-printing part in order to suppress ejection failure from an ink head due to drying.

In some inkjet recording apparatuses, an ink head that ejects ink and a treatment liquid head that ejects a treatment liquid (flocculation agent) having a flocculation effect on ink are mounted on a single carriage (see, for example, Japanese Patent Application Laid-Open No. 8-72234). Furthermore, some inkjet recording apparatuses include a discharging part that discharges ink, a flocculation agent, and the like (see, for example, Japanese Patent Application No. 2005-225115). Japanese Patent Application No. 2005-225115 describes an inkjet recording apparatus having a capping device that functions as a container that receives ink droplets ejected from a recording head by flushing.

Further, in some inkjet recording apparatuses, a discharging member such as sponge is disposed in a discharging part, and ink, a flocculation agent, and the like are ejected from a nozzle of each head on the discharging member.

In such an inkjet recording apparatus, a floating amount of mist such as ink or a flocculation agent generated at the time of discharging increases as a gap between the nozzle of the head and the target object increases. Therefore, the gap between the nozzle of the head and the target object is generally designed as small as possible.

However, in a case where the sponge is used as the discharging member, there is also a problem of processing accuracy of the discharging member, and the gap at the discharging part is designed to be wider than the gap at the printing part. In addition, when printing is performed on a thick cloth, the gap at the discharging part is further increased as a result of adjusting the gap between the nozzle of the head and the target object. Therefore, the gap of the discharging part tends to be larger than that of the printing part, and the floating amount of the mist at the discharging part tends to increase.

In particular, when the ink head and the treatment liquid head are mounted on a single carriage, the mist of the treatment liquid adheres to the nozzles of the ink head to cause flocculation of the ink, so that nozzle clogging easily occurs. Furthermore, in general, since the ink is flocculated with a small amount of flocculation agent with respect to the amount of ink of the coloring material ink, nozzle clogging is more likely to occur at the time of adhesion of the mist of the treatment liquid to the ink head than at the time of adhesion of the mist of the ink to the treatment liquid head even with an equivalent amount of mist.

In the conventional technique described in Japanese Patent Application Laid-Open No. 8-72234, since the arrangement and position of the discharging part are not mentioned, nozzle clogging is likely to occur in the ink head due to the adhesion of the mist of the treatment liquid to the ink head.

Further, in the conventional technique described in Japanese Patent Application No. 2005-225115, since the treatment liquid is discharged at the printing part, the gap at the time of discharging the treatment liquid is small, and the floating amount of the mist of the treatment liquid at the time of discharging the treatment liquid can be reduced. However, in the conventional technique described in Japanese Patent Application No. 2005-225115, since the treatment liquid is discharged on the printing part, density unevenness of the treatment liquid occurs, and the print quality is deteriorated at the time of printing with many solid images.

SUMMARY

The present invention has been made in view of the problems of the conventional techniques, and an object of the present invention is to provide an inkjet recording apparatus and a program that reduce adhesion of mist of a treatment liquid to an ink head at the time of discharging the treatment liquid.

To achieve the abovementioned object, according to an aspect of the present invention, an inkjet recording apparatus of a scanning type reflecting one aspect of the present invention comprises: a treatment liquid head that ejects a treatment liquid having a flocculation effect on a coloring material ink and a coloring material; and an ink head that ejects the coloring material ink in a single carriage, wherein the ink head does not pass through a treatment liquid discharging part after discharging the treatment liquid in a same scan.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1A:
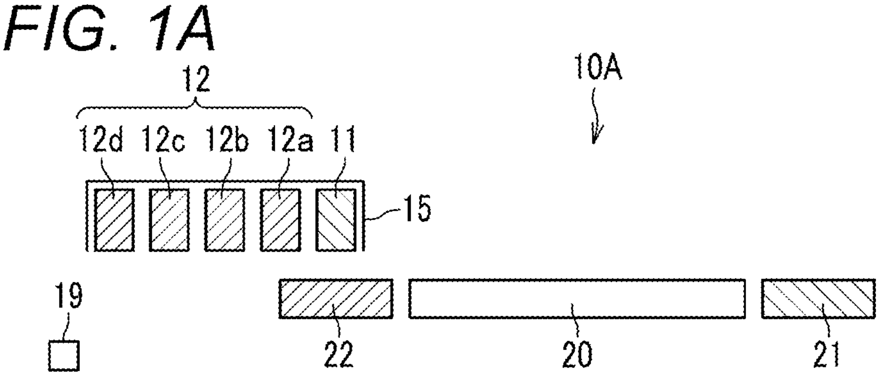
FIG. 1A is an explanatory diagram (1) of a configuration and an operation of an inkjet recording apparatus according to a first embodiment.

Hereinafter, one or more embodiments of the present invention will be described with reference to the drawings. However, the scope of the invention is not limited to the disclosed embodiments. It should be noted that the drawings are only schematically illustrated to the extent that the present invention can be sufficiently understood. Therefore, the present invention is not limited only to the illustrated example. In the drawings, the same reference numerals are given to common components and similar components, and redundant description thereof will be omitted.

The present invention provides an inkjet recording apparatus of a scanning type including a treatment liquid head that ejects a treatment liquid (flocculation agent) having a flocculation effect on a coloring material ink and a coloring material and an ink head that ejects the coloring material ink in a single carriage, in which a control part of the inkjet recording apparatus performs control so that the ink head does not pass through a treatment liquid discharging part (flocculation agent discharging part) after discharging the treatment liquid (flocculation agent) in the same scan.

Inkjet recording apparatuses 10A, 10B, 10C, and 10D according to first to fourth embodiments described later have the above-described feature of "control so that the ink head does not pass through the discharging part of the treatment liquid (flocculation agent) after discharging the treatment liquid in the same scan". Since the inkjet recording apparatuses 10A, 10B, 10C, and 10D according to the first to fourth embodiments have the above-described feature, it is possible to reduce the adhesion of the mist of the treatment liquid (flocculation agent) to the ink head at the time of discharging the treatment liquid.

First Embodiment

First, the configuration and operation of an inkjet recording apparatus 10A according to a first embodiment of the present invention will be described with reference to FIGS. 1A to 1D. FIGS. 1A to 1D are explanatory diagrams of the configuration and operation of the inkjet recording apparatus 10A according to the first embodiment. FIGS. 1A to 1D schematically illustrate a configuration near a carriage 15 (hereinafter, the same applies to the other drawings). Here, a description will be given assuming that the inkjet recording apparatus 10A according to the first embodiment is configured as a scanning type printer.

As illustrated in FIG. 1A, the inkjet recording apparatus 10A according to the first embodiment includes the carriage 15 on which a flocculation agent head 11 and an ink head 12 are mounted, a control part 19, a printing region 20, a flocculation agent discharging part 21, and an ink discharging part 22.

The flocculation agent head 11 is a head that ejects a flocculation agent from a head surface on a lower surface side. The flocculation agent is a treatment liquid having a flocculation effect on the coloring material ink and the coloring material. Here, the description will be given on the assumption that the "treatment liquid" is a liquid ejected from the flocculation agent head 11 to the recording medium and the "coloring material" is a liquid applied to the recording medium.

The ink head 12 is a head that ejects the coloring material ink from the head surface on the lower surface side.

The carriage 15 is a member on which the flocculation agent head 11 and the ink head 12 are mounted and which moves in the main scanning direction (left-right direction in the drawing). Here, a description will be given assuming that a direction from the center of the carriage 15 toward the position of the treatment liquid head (flocculation agent head 11) is upstream.

The control part 19 is a means that controls the ejecting operation of the flocculation agent head 11, the ejecting operation of the ink head 12, the moving operation of the carriage 15, and the like. The control part 19 performs control so that the ink head 12 does not pass through the discharging part (flocculation agent discharging part 21) of the treatment liquid (flocculation agent) after discharging the treatment liquid in the same scan.

The printing region 20 is a region where an image can be printed.

The flocculation agent discharging part 21 is a part that discharges the flocculation agent. In the flocculation agent discharging part 21, a discharging member such as sponge or cloth is disposed.

The ink discharging part 22 is a part that discharges the coloring material ink. In the ink discharging part 22, a discharging member such as sponge or cloth is disposed.

FIGS. 1A to 1D illustrate an operation in the case of discharging the flocculation agent (treatment liquid) to the flocculation agent discharging part 21 (hereinafter, the same applies to the drawings of other embodiments). The discharging of the flocculation agent (treatment liquid) can be performed at an arbitrary timing. For example, in the case of printing an image, that is, in the case of printing an image by ejecting the coloring material ink from the ink head 12 onto a recording medium such as a fabric or a sheet-like resin disposed on the printing region 20, whether or not the flocculation agent (treatment liquid) is discharged can be determined based on a predetermined condition. As the predetermined condition at that time, for example, since the flocculation agent (treatment liquid) dries more easily as the duty ratio is smaller, it is possible to use a condition that the duty ratio of the flocculation agent (treatment liquid) in the previous scan is equal to or less than an arbitrarily determined threshold value.

In the present embodiment, the duty ratio is a value calculated by the following Formula (1).

$$\text{Duty ratio (\%)} = \text{number of actual printing dots}/(\text{vertical resolution} \times \text{horizontal resolution}) \times 100 \quad (1)$$

In the above Formula (1), "the number of actual printing dots" is the number of actual printing dots per unit area, and "longitudinal resolution" and "lateral resolution" are resolutions per unit area. The case where the duty ratio is 100% means the maximum ink weight of a single color with respect to the pixel.

As illustrated in FIG. 1A, in the inkjet recording apparatus 10A according to the first embodiment, the carriage 15 includes the flocculation agent head 11 and four ink heads 12*a*, 12*b*, 12*c*, and 12*d* corresponding to respective coloring material inks of yellow, magenta, cyan, and black from the right side to the left side in the drawing (hereinafter, the same applies to other embodiments). Further, the flocculation agent discharging part 21 is disposed on the right side of the printing region 20, and the ink discharging part 22 is disposed on the left side of the printing region 20.

Here, a path along which the carriage 15 moves from the outside of the region on the left side to the outside of the region on the right side of the printing region 20 will be referred to as a "forward path", and a path along which the carriage 15 moves from the outside of the region on the right side to the outside of the region on the left side of the printing region 20 will be referred to as a "backward path" (hereinafter, the same applies to other embodiments). However, the inkjet recording apparatus can be configured in the opposite configuration, that is, the path along which the carriage 15 moves from the outside of the region on the right side to the outside of the region on the left side of the printing region 20 can be configured as the "forward path", and the path along which the carriage 15 moves from the outside of the region on the left side to the outside of the region on the right side of the printing region 20 can be configured as the "backward path" (hereinafter, the same applies to other embodiments). In the example illustrated in FIG. 1A, the carriage 15 has the flocculation agent head 11 mounted on the right side and the ink head 12 mounted on the left side. That is, in the carriage 15, the flocculation agent head 11 is mounted on the upstream side, and the ink head 12 is mounted on the downstream side in the forward path direction.

Figure 1B:
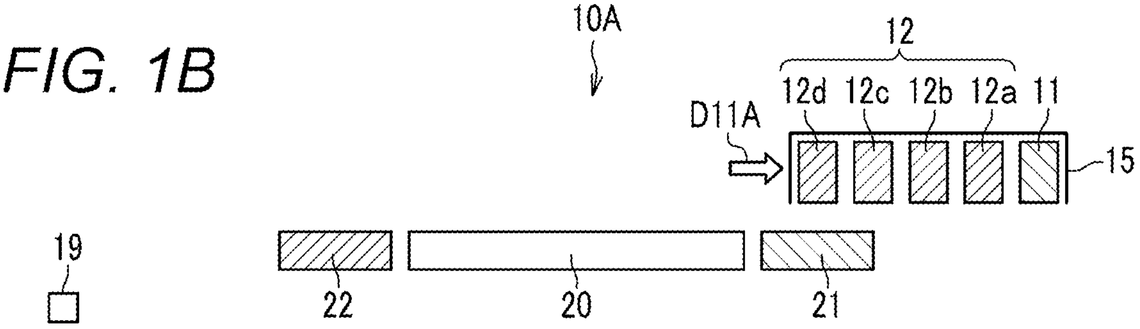
FIG. 1B is an explanatory diagram (2) of the configuration and operation of the inkjet recording apparatus according to the first embodiment.

In the embodiment illustrated in FIG. 1A, the control part 19 of the inkjet recording apparatus 10A according to the first embodiment disposes the carriage 15 outside the region on the left side of the printing region 20. Here, as illustrated in FIG. 1B, it is assumed that the control part 19 of the inkjet recording apparatus 10A according to the first embodiment controls the carriage 15 to move to the outside of the region on the right side of the printing region 20 in the forward path direction (see an outlined arrow D11A), which is the direction from left to right in the drawing.

Figure 1C:
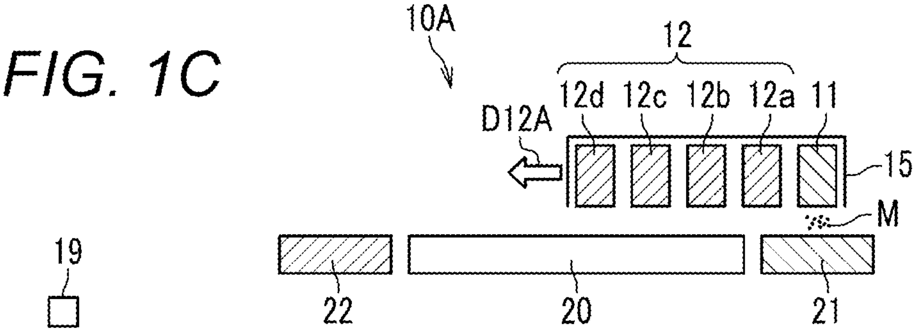
FIG. 1C is an explanatory diagram (3) of the configuration and operation of the inkjet recording apparatus according to the first embodiment.

Next, as illustrated in FIG. 1C, it is assumed that the control part 19 of the inkjet recording apparatus 10A according to the first embodiment controls the carriage 15 to move in the backward path direction (see an outlined arrow D12A), which is a direction from right to left in the drawing, so that the flocculation agent head 11 is disposed above the flocculation agent discharging part 21, and further controls the flocculation agent head 11 to eject the flocculation agent toward the flocculation agent discharging part 21. At this time, the mist M of the flocculation agent floats above the flocculation agent discharging part 21.

Figure 1D:
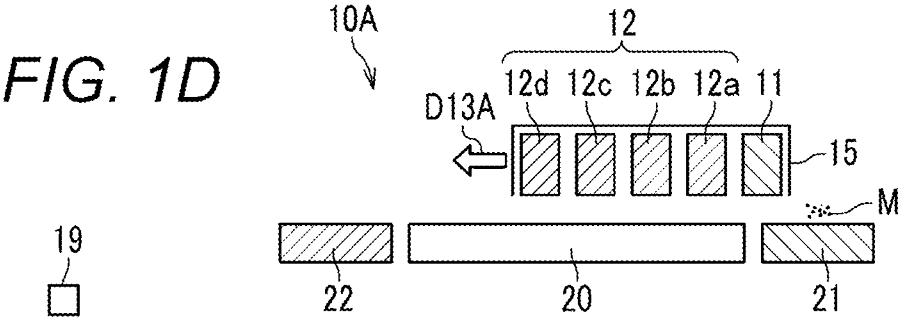
FIG. 1D is an explanatory diagram (4) of the configuration and operation of the inkjet recording apparatus according to the first embodiment.

Next, as illustrated in FIG. 1D, it is assumed that the control part 19 of the inkjet recording apparatus 10A according to the first embodiment performs control so as to move in the backward path direction (see an outlined arrow D13A). At this time, since the ink head 12 does not pass over the flocculation agent discharging part 21, the inkjet recording apparatus 10A according to the first embodiment can reduce the adhesion of the mist M of the flocculation agent to the head surface (lower surface) of the ink head 12. The inkjet recording apparatus 10A according to the first embodiment can suppress flocculation of the coloring material ink on the head surface, and thus can suppress occurrence of nozzle clogging.

Second Embodiment

Hereinafter, a configuration and an operation of an inkjet recording apparatus 10B according to a second embodiment will be described with reference to FIGS. 2A to 2D. FIGS. 2A to 2D are explanatory diagrams of the configuration and operation of the inkjet recording apparatus 10B according to the second embodiment.

Figure 2A:
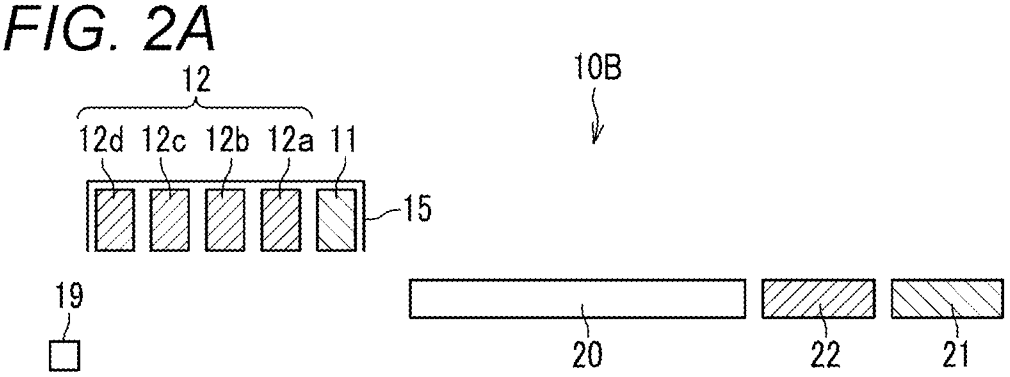
FIG. 2A is an explanatory diagram (1) of a configuration and an operation of an inkjet recording apparatus according to a second embodiment.

As illustrated in FIG. 2A, in the inkjet recording apparatus 10B according to the second embodiment, the ink discharging part 22 is disposed on the right side of the printing region 20, and further, the flocculation agent discharging part 21 is disposed on the right side of the ink discharging part 22.

Figure 2B:
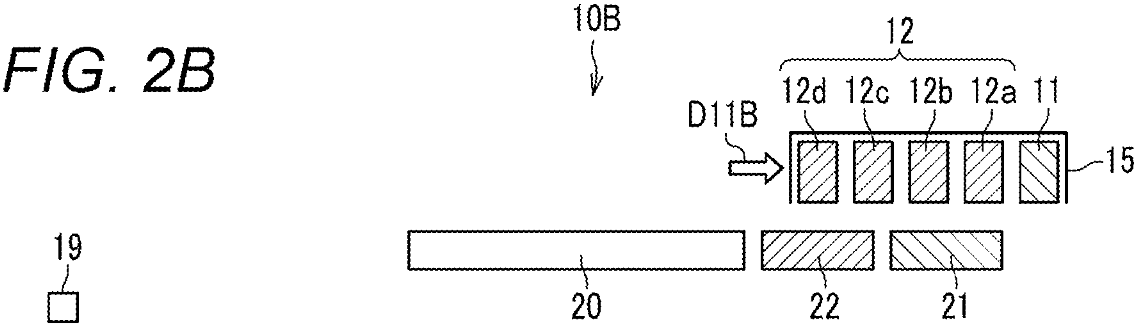
FIG. 2B is an explanatory diagram (2) of the configuration and operation of the inkjet recording apparatus according to the second embodiment.

In the embodiment illustrated in FIG. 2A, the control part 19 of the inkjet recording apparatus 10B according to the second embodiment disposes the carriage 15 outside the region on the left side of the printing region 20. Here, as illustrated in FIG. 2B, it is assumed that the control part 19 of the inkjet recording apparatus 10B according to the second embodiment controls the carriage 15 to move to the outside of the region on the right side of the printing region 20 in the forward path direction (see an outlined arrow D11B).

Figure 2C:
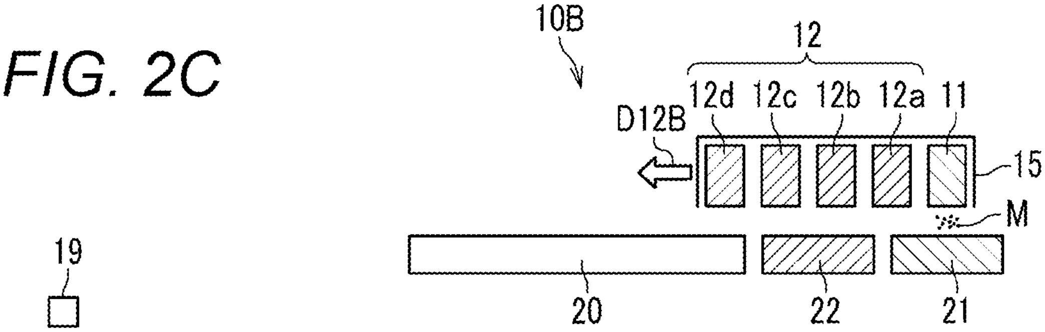
FIG. 2C is an explanatory diagram (3) of the configuration and operation of the inkjet recording apparatus according to the second embodiment.

Next, as illustrated in FIG. 2C, it is assumed that the control part 19 of the inkjet recording apparatus 10B according to the second embodiment controls the carriage 15 to move in the backward path direction (see an outlined arrow D12B) so that the flocculation agent head 11 is disposed above the flocculation agent discharging part 21, and further controls the flocculation agent head 11 to eject the flocculation agent toward the flocculation agent discharging part 21. At this time, the mist M of the flocculation agent floats above the flocculation agent discharging part 21.

Figure 2D:
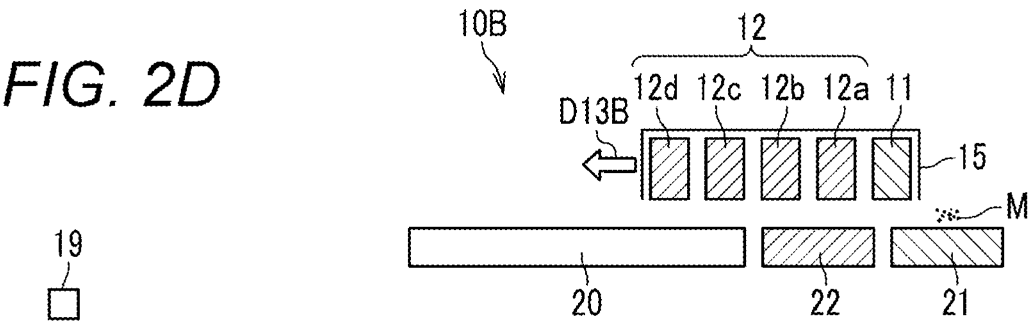
FIG. 2D is an explanatory diagram (4) of the configuration and operation of the inkjet recording apparatus according to the second embodiment.

Next, as illustrated in FIG. 2D, it is assumed that the control part 19 of the inkjet recording apparatus 10B according to the second embodiment performs control so as to move in the backward path direction (see an outlined arrow D13B). At this time, since the ink head 12 does not pass over the flocculation agent discharging part 21, the inkjet recording apparatus 10B according to the second embodiment can reduce the adhesion of the mist M of the flocculation agent to the head surface (lower surface) of the ink head 12. The inkjet recording apparatus 10B according to the second embodiment can suppress flocculation of the coloring material ink on the head surface, and thus can suppress occurrence of nozzle clogging.

Third Embodiment

Hereinafter, a configuration and an operation of an inkjet recording apparatus 10C according to a third embodiment will be described with reference to FIGS. 3A to 3D. FIGS. 3A to 3D are explanatory diagrams of the configuration and operation of the inkjet recording apparatus 10C according to the third embodiment.

Figure 3A:
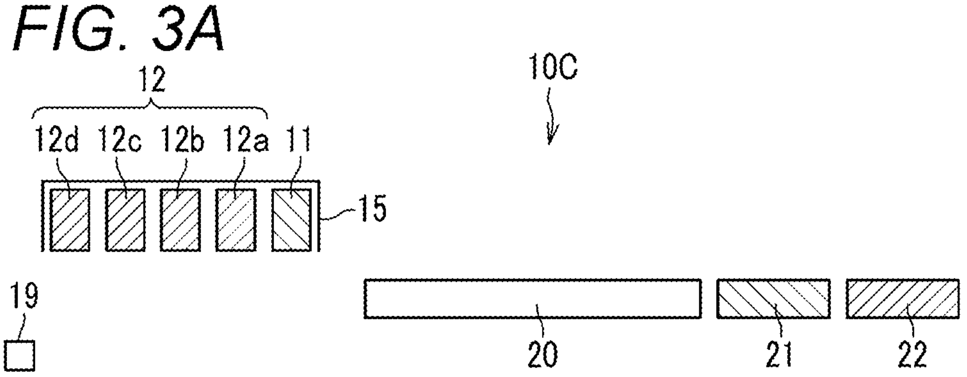
FIG. 3A is an explanatory diagram (1) of a configuration and an operation of an inkjet recording apparatus according to a third embodiment.

As illustrated in FIG. 3A, in the inkjet recording apparatus 10C according to the third embodiment, the flocculation agent discharging part 21 is disposed on the right side of the printing region 20, and further, the ink discharging part 22 is disposed on the right side of the flocculation agent discharging part 21.

Figure 3B:
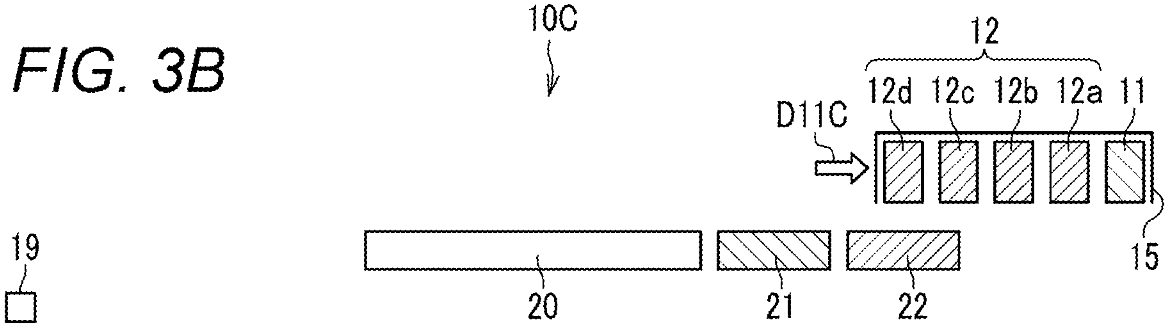
FIG. 3B is an explanatory diagram (2) of the configuration and operation of the inkjet recording apparatus according to the third embodiment.

In the embodiment illustrated in FIG. 3A, the control part 19 of the inkjet recording apparatus 10C according to the third embodiment disposes the carriage 15 outside the region on the left side of the printing region 20. Here, as illustrated in FIG. 3B, it is assumed that the control part 19 of the inkjet recording apparatus 10C according to the third embodiment controls the carriage 15 to move to the outside of the region on the right side of the printing region 20 in the forward path direction (see an outlined arrow D11C).

Figure 3C:
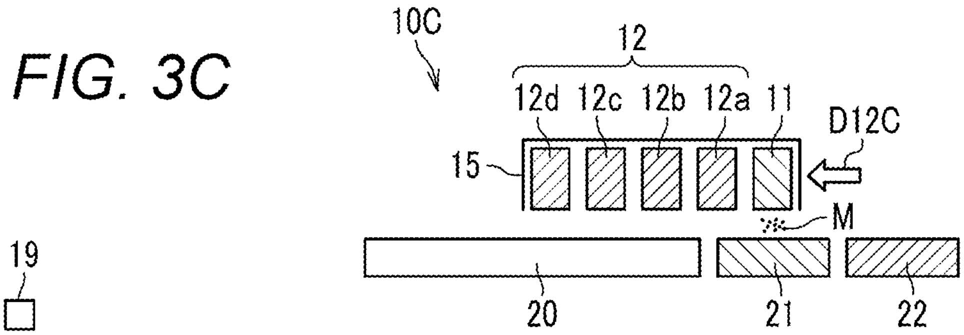
FIG. 3C is an explanatory diagram (3) of the configuration and operation of the inkjet recording apparatus according to the third embodiment.

Next, as illustrated in FIG. 3C, it is assumed that the control part 19 of the inkjet recording apparatus 10C according to the third embodiment controls the carriage 15 to move in the backward path direction (see an outlined arrow D12C) so that the flocculation agent head 11 is disposed above the flocculation agent discharging part 21, and further controls the flocculation agent head 11 to eject the flocculation agent toward the flocculation agent discharging part 21. At this time, the mist M of the flocculation agent floats above the flocculation agent discharging part 21.

Figure 3D:
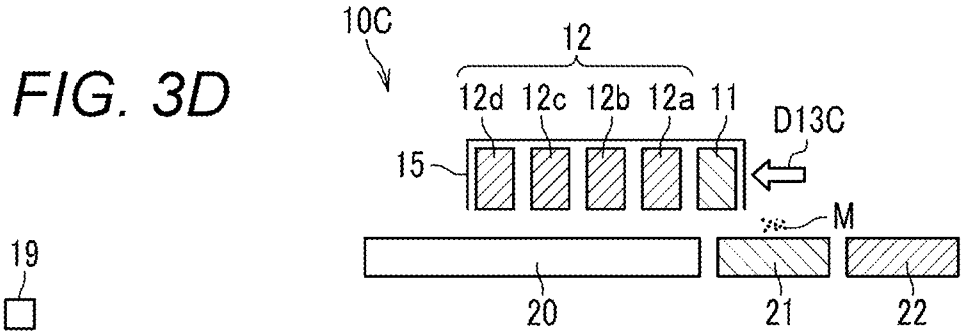
FIG. 3D is an explanatory diagram (4) of the configuration and operation of the inkjet recording apparatus according to the third embodiment.

Next, as illustrated in FIG. 3D, it is assumed that the control part 19 of the inkjet recording apparatus 10C according to the third embodiment performs control so as to move in the backward path direction (see an outlined arrow D13C). At this time, since the ink head 12 does not pass over the flocculation agent discharging part 21, the inkjet recording apparatus 10C according to the third embodiment can reduce the adhesion of the mist M of the flocculation agent to the head surface (lower surface) of the ink head 12. The inkjet recording apparatus 10C according to the third embodiment can suppress flocculation of the coloring material ink on the head surface, and thus can suppress occurrence of nozzle clogging.

Fourth Embodiment

Hereinafter, a configuration and an operation of an inkjet recording apparatus 10D according to a fourth embodiment will be described with reference to FIGS. 4A to 4E. FIGS. 4A to 4E are explanatory diagrams of the configuration and operation of the inkjet recording apparatus 10D according to the fourth embodiment.

Figure 4A:
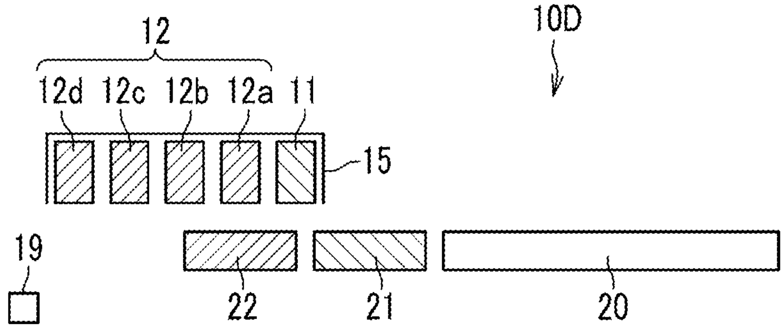
FIG. 4A is an explanatory diagram (1) of a configuration and an operation of an inkjet recording apparatus according to a fourth embodiment.

As illustrated in FIG. 4A, in the inkjet recording apparatus 10D according to the fourth embodiment, the flocculation agent discharging part 21 is disposed on the left side of the printing region 20, and the ink discharging part 22 is disposed on the left side of the flocculation agent discharging part 21.

Figure 4B:
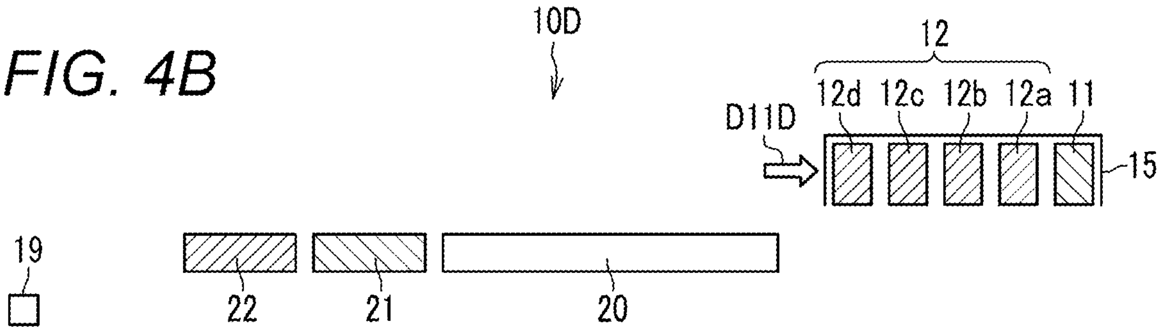
FIG. 4B is an explanatory diagram (2) of the configuration and operation of the inkjet recording apparatus according to the fourth embodiment.

In the embodiment illustrated in FIG. 4A, the control part 19 of the inkjet recording apparatus 10D according to the fourth embodiment disposes the carriage 15 outside the region on the left side of the printing region 20. Here, as illustrated in FIG. 4B, it is assumed that the control part 19 of the inkjet recording apparatus 10D according to the fourth embodiment controls the carriage 15 to move to the outside of the region on the right side of the printing region 20 in the forward path direction (see an outlined arrow D11D).

Figure 4C:
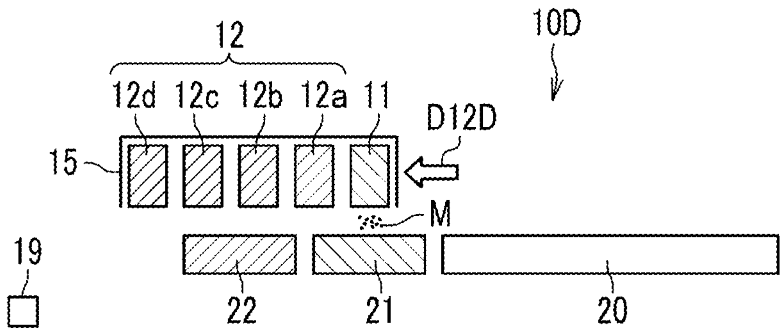
FIG. 4C is an explanatory diagram (3) of the configuration and operation of the inkjet recording apparatus according to the fourth embodiment.

Next, as illustrated in FIG. 4C, it is assumed that the control part 19 of the inkjet recording apparatus 10D according to the fourth embodiment controls the carriage 15 to move in the backward path direction (see an outlined arrow D12D) so that the flocculation agent head 11 is disposed above the flocculation agent discharging part 21, and further controls the flocculation agent head 11 to eject the flocculation agent toward the flocculation agent discharging part 21. At this time, the mist M of the flocculation agent floats above the flocculation agent discharging part 21.

Figure 4D:
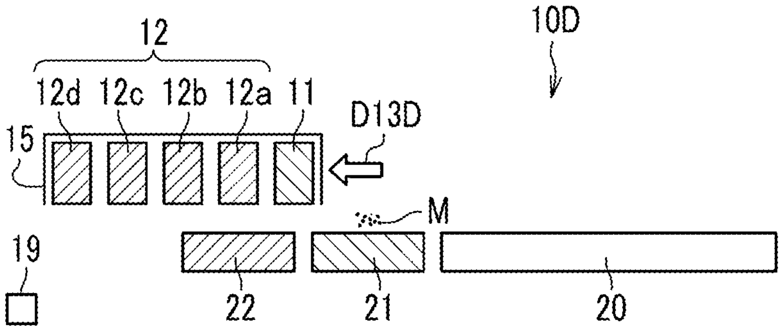
FIG. 4D is an explanatory diagram (4) of the configuration and operation of the inkjet recording apparatus according to the fourth embodiment.

Next, as illustrated in FIG. 4D, it is assumed that the control part 19 of the inkjet recording apparatus 10D according to the fourth embodiment performs control so as to move in the backward path direction (see an outlined arrow D13D). At this time, since the ink head 12 does not pass over the flocculation agent discharging part 21, the inkjet recording apparatus 10D according to the fourth embodiment can reduce the adhesion of the mist M of the flocculation agent to the head surface (lower surface) of the ink head 12. At this time, since the mist M of the flocculation agent falls and adheres to the flocculation agent discharging part 21, the density of the mist M of the flocculation agent floating above the flocculation agent discharging part 21 decreases.

Figure 4E:
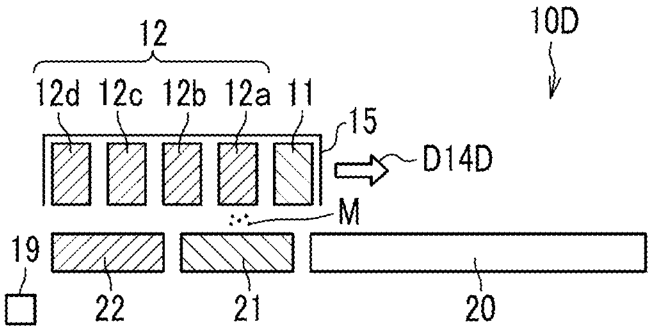
FIG. 4E is an explanatory diagram (5) of the configuration and operation of the inkjet recording apparatus according to the fourth embodiment.

Next, as illustrated in FIG. 4E, it is assumed that the control part 19 of the inkjet recording apparatus 10D according to the fourth embodiment controls the carriage 15 to move in the forward path direction (see an outlined arrow D14D). At this time, since the density of the mist M of the flocculation agent floating above the flocculation agent discharging part 21 is reduced, the inkjet recording apparatus 10D according to the fourth embodiment can reduce the adhesion of the mist M of the flocculation agent to the head surface (lower surface) of the ink head 12. The inkjet recording apparatus 10D according to the fourth embodiment can suppress flocculation of the coloring material ink on the head surface, and thus can suppress occurrence of nozzle clogging.

Here, in order to describe the configuration and operation of the inkjet recording apparatuses 10A, 10B, 10C, and 10D according to the first to fourth embodiments in an easy-to-understand manner, the configuration and operation of the inkjet recording apparatuses 110A, 110B, 110C, and 110D of first to fourth comparative examples that do not have the above-described feature of "control so that the ink head does not pass through the discharging part of the treatment liquid (flocculation agent) after discharging the treatment liquid in the same scan" will be described. Since the inkjet recording apparatuses 110A, 110B, 110C, and 110D of the first to fourth comparative examples do not have the above-described feature, it is not possible to reduce the adhesion of the mist of the treatment liquid (flocculation agent) to the ink head at the time of discharging the treatment liquid.

First Comparative Example

Figure 7A:
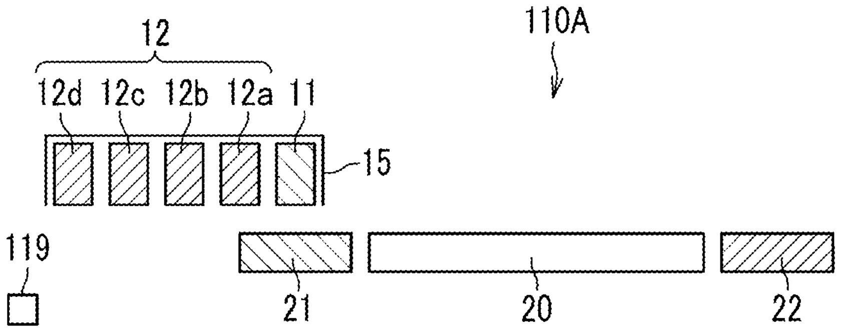
FIG. 7A is an explanatory diagram (1) of a configuration and an operation of an inkjet recording apparatus of a first comparative example.
Figure 7B:
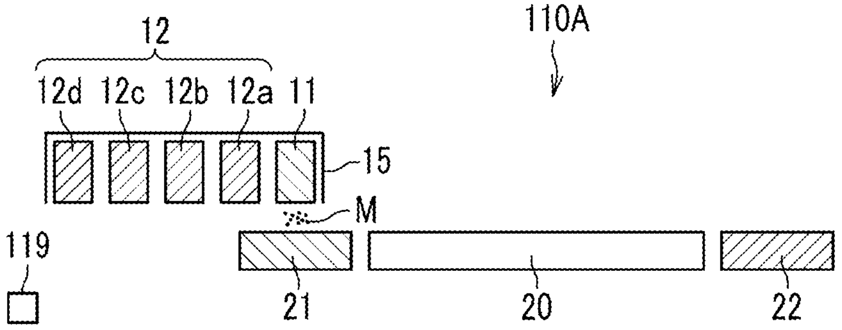
FIG. 7B is an explanatory diagram (2) of the configuration and operation of the inkjet recording apparatus of the first comparative example.
Figure 7C:
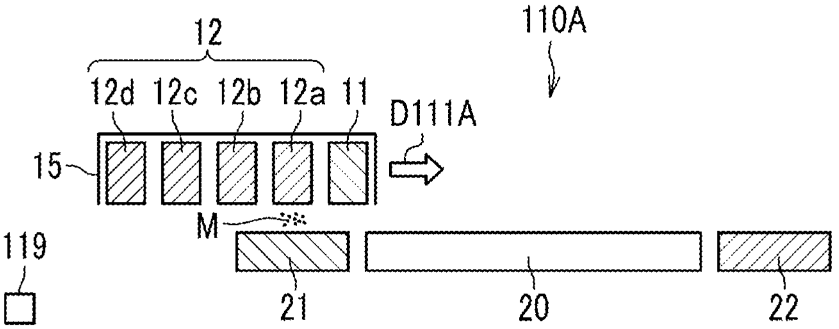
FIG. 7C is an explanatory diagram (3) of the configuration and operation of the inkjet recording apparatus of the first comparative example.

First, the configuration and operation of an inkjet recording apparatus 110A of a first comparative example will be described with reference to FIGS. 7A to 7C. FIGS. 7A to 7C are explanatory diagrams of the configuration and operation of the inkjet recording apparatus 110A of the first comparative example.

As illustrated in FIG. 7A, the inkjet recording apparatus 110A of the first comparative example is different from the inkjet recording apparatuses 10A, 10B, 10C, and 10D (see FIGS. 1A to 4E) according to the first to fourth embodiments in that a control part 119 is included instead of the control part 19. Similarly, to the control part 19, the control part 119 of the inkjet recording apparatus 110A of the first comparative example is a means that controls the ejecting operation of the flocculation agent head 11, the ejecting operation of the ink head 12, the moving operation of the carriage 15, and the like. However, the control part 119 may execute an operation by which the ink head 12 passes through the discharging part (flocculation agent discharging part 21) of the treatment liquid (flocculation agent) after discharging the treatment liquid in the same scan.

As illustrated in FIG. 7A, in the inkjet recording apparatus 110A of the first comparative example, the carriage 15 includes the flocculation agent head 11 and the four ink heads 12*a*, 12*b*, 12*c*, and 12*d* corresponding to respective coloring material inks of yellow, magenta, cyan, and black from the right side to the left side in the drawing (hereinafter, the same applies to other comparative examples). Further, the flocculation agent discharging part 21 is disposed on the right side of the printing region 20, and the ink discharging part 22 is disposed on the left side of the printing region 20.

In the example illustrated in FIG. 7A, the control part 119 of the inkjet recording apparatus 110A of the first comparative example stops the carriage 15 in a state where the flocculation agent head 11 is disposed above the flocculation agent discharging part 21. Here, as illustrated in FIG. 7B, it is assumed that the control part 119 of the inkjet recording apparatus 110A of the first comparative example controls the flocculation agent head 11 to eject the flocculation agent toward the flocculation agent discharging part 21. At this time, the mist M of the flocculation agent floats above the flocculation agent discharging part 21.

Next, as illustrated in FIG. 7C, it is assumed that the control part 119 of the inkjet recording apparatus 110A of the first comparative example controls the carriage 15 to move in the forward path direction (see an outlined arrow D111A). At this time, since the ink head 12 passes over the flocculation agent discharging part 21, there is a possibility that the mist M of the flocculation agent adheres to the head surface (lower surface) of the ink head 12 (in particular, the ink head 12*a*). When the mist M of the flocculation agent adheres to the head surface of the ink head 12, flocculation of the coloring material ink occurs on the head surface, and nozzle clogging easily occurs. Therefore, the configuration and operation of the inkjet recording apparatus 110A of the first comparative example are not preferable.

Second Comparative Example

Figure 8A:
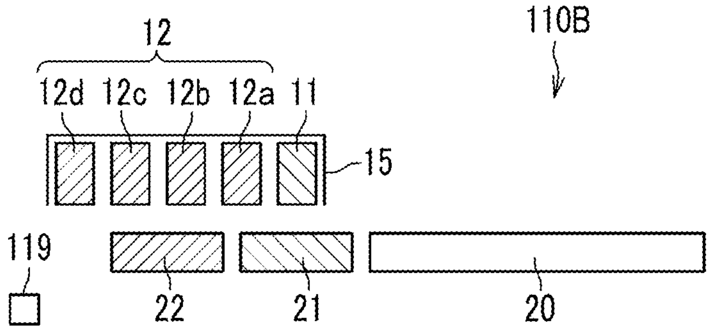
FIG. 8A is an explanatory diagram (1) of a configuration and an operation of an inkjet recording apparatus of a second comparative example.
Figure 8B:
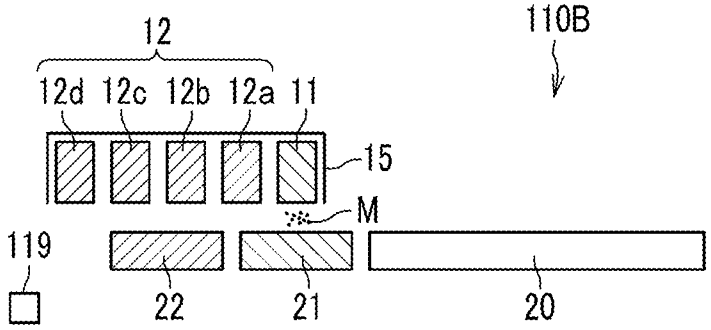
FIG. 8B is an explanatory diagram (2) of the configuration and operation of the inkjet recording apparatus of the second comparative example.
Figure 8C:
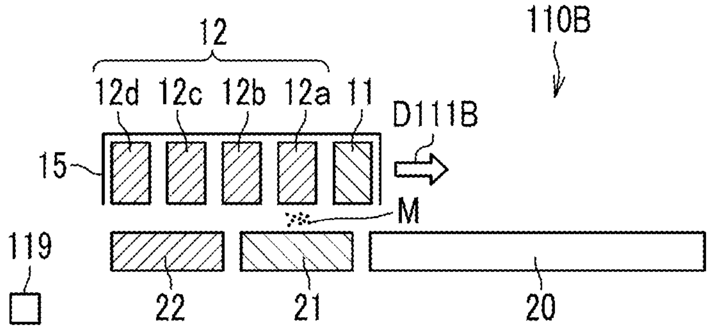
FIG. 8C is an explanatory diagram (3) of the configuration and operation of the inkjet recording apparatus of the second comparative example.

Next, the configuration and operation of an inkjet recording apparatus 110B of a second comparative example will be described with reference to FIGS. 8A to 8C. FIGS. 8A to 8C are explanatory diagrams of the configuration and operation of the inkjet recording apparatus 110B of the second comparative example.

As illustrated in FIG. 8A, in the inkjet recording apparatus 110B of the second comparative example, the flocculation agent discharging part 21 is disposed on the left side of the printing region 20, and further, the ink discharging part 22 is disposed on the left side of the flocculation agent discharging part 21.

In the example illustrated in FIG. 8A, the control part 119 of the inkjet recording apparatus 110B of the second comparative example stops the carriage 15 in a state where the flocculation agent head 11 is disposed above the flocculation agent discharging part 21. Here, as illustrated in FIG. 8B, it is assumed that the control part 119 of the inkjet recording apparatus 110B of the second comparative example controls the flocculation agent head 11 to eject the flocculation agent toward the ink discharging part 22. At this time, the mist M of the flocculation agent floats above the flocculation agent discharging part 21.

Next, as illustrated in FIG. 8C, it is assumed that the control part 119 of the inkjet recording apparatus 110B of the second comparative example controls the carriage 15 to move in the forward path direction (see an outlined arrow D111B). At this time, since the ink head 12 passes over the flocculation agent discharging part 21, there is a possibility that the mist M of the flocculation agent adheres to the head surface (lower surface) of the ink head 12 (in particular, the ink head 12*a*). When the mist M of the flocculation agent adheres to the head surface of the ink head 12, flocculation of the coloring material ink occurs on the head surface, and nozzle clogging easily occurs. Therefore, the configuration and operation of the inkjet recording apparatus 110B of the second comparative example are not preferable.

Third Comparative Example

Figure 9A:
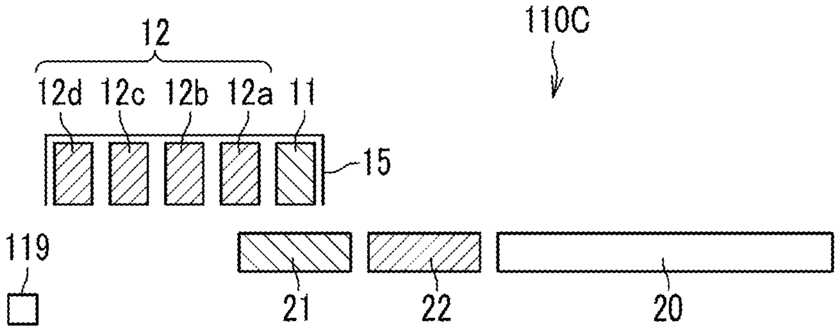
FIG. 9A is an explanatory diagram (1) of a configuration and an operation of an inkjet recording apparatus of a third comparative example.
Figure 9B:
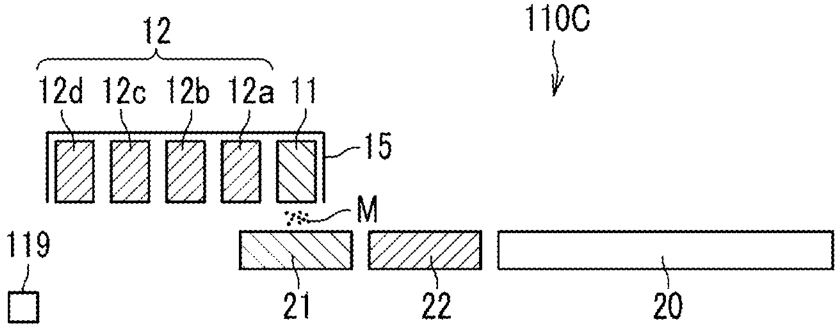
FIG. 9B is an explanatory diagram (2) of the configuration and operation of the inkjet recording apparatus of the third comparative example.
Figure 9C:
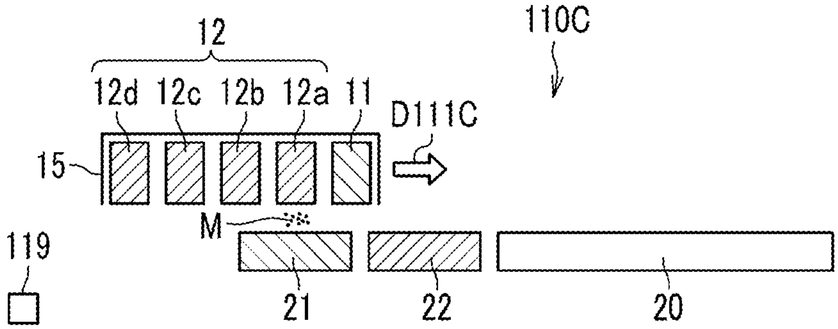
FIG. 9C is an explanatory diagram (3) of the configuration and operation of the inkjet recording apparatus of the third comparative example.

Next, the configuration and operation of an inkjet recording apparatus 110C of a third comparative example will be described with reference to FIGS. 9A to 9C. FIGS. 9A to 9C are explanatory diagrams of the configuration and operation of the inkjet recording apparatus 110C according to the third comparative example.

As illustrated in FIG. 9A, in the inkjet recording apparatus 110C of the third comparative example, the ink discharging part 22 is disposed on the left side of the printing region 20, and further, the flocculation agent discharging part 21 is disposed on the left side of the ink discharging part 22.

In the example illustrated in FIG. 9A, the control part 119 of the inkjet recording apparatus 110C of the third comparative example stops the carriage 15 in a state where the flocculation agent head 11 is disposed above the flocculation agent discharging part 21. Here, as illustrated in FIG. 9B, it is assumed that the control part 119 of the inkjet recording apparatus 110C of the third comparative example controls the flocculation agent head 11 to eject the flocculation agent toward the flocculation agent discharging part 21. At this time, the mist M of the flocculation agent floats above the flocculation agent discharging part 21.

Next, as illustrated in FIG. 9C, it is assumed that the control part 119 of the inkjet recording apparatus 110C of the third comparative example controls the carriage 15 to move in the forward path direction (see an outlined arrow D111C). At this time, since the ink head 12 passes over the flocculation agent discharging part 21, there is a possibility that the mist M of the flocculation agent adheres to the head surface (lower surface) of the ink head 12 (in particular, the ink head 12*a*). When the mist M of the flocculation agent adheres to the head surface of the ink head 12, flocculation of the coloring material ink occurs on the head surface, and nozzle clogging easily occurs. Therefore, the configuration and operation of the inkjet recording apparatus 110C of the third comparative example are not preferable.

Fourth Comparative Example

Figure 10A:
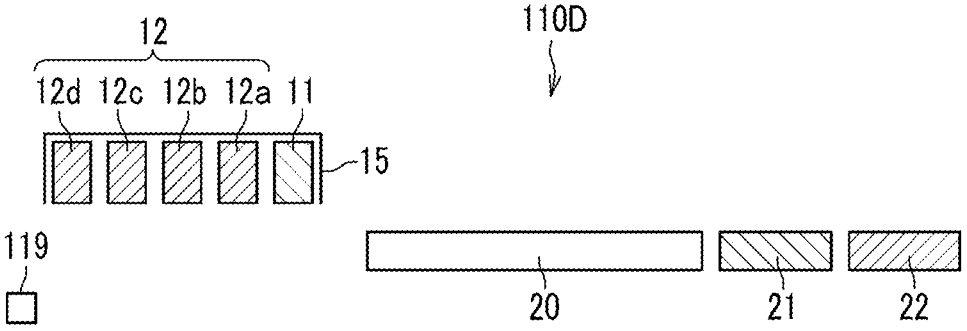
FIG. 10A is an explanatory diagram (1) of a configuration and an operation of an inkjet recording apparatus of a fourth comparative example.
Figure 10B:
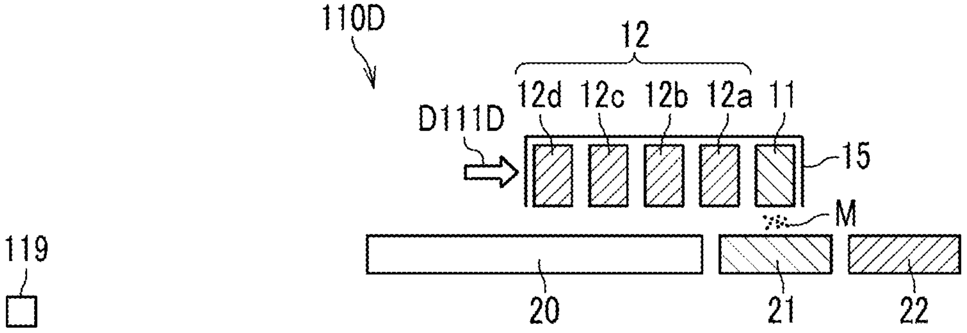
FIG. 10B is an explanatory diagram (2) of the configuration and operation of the inkjet recording apparatus of the fourth comparative example.
Figure 10C:
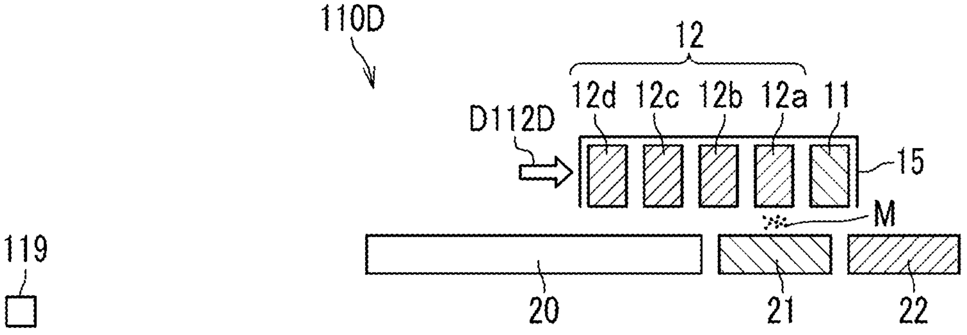
FIG. 10C is an explanatory diagram (3) of the configuration and operation of the inkjet recording apparatus of the fourth comparative example.

Next, the configuration and operation of an inkjet recording apparatus 110D of a fourth comparative example will be described with reference to FIGS. 10A to 10C. FIGS. 10A to 10C are explanatory diagrams of the configuration and operation of the inkjet recording apparatus 110D of the fourth comparative example.

As illustrated in FIG. 10A, in the inkjet recording apparatus 110D of the fourth comparative example, the flocculation agent discharging part 21 is disposed on the right side of the printing region 20, and further, the ink discharging part 22 is disposed on the right side of the flocculation agent discharging part 21.

In the example illustrated in FIG. 10A, the control part 119 of the inkjet recording apparatus 110D of the fourth comparative example disposes the carriage 15 outside the region on the left side of the printing region 20. Here, as illustrated in FIG. 10B, it is assumed that the control part 119 of the inkjet recording apparatus 110D of the fourth comparative example controls the carriage 15 to move in the forward path direction (see an outlined arrow D111D) so that the flocculation agent head 11 is disposed above the flocculation agent discharging part 21, and further controls the flocculation agent head 11 to eject the flocculation agent toward the flocculation agent discharging part 21. At this time, the mist M of the flocculation agent floats above the flocculation agent discharging part 21.

Next, as illustrated in FIG. 10C, it is assumed that the control part 119 of the inkjet recording apparatus 110D of the fourth comparative example controls the carriage 15 to move in the forward path direction (see an outlined arrow D112D). At this time, since the ink head 12 passes over the flocculation agent discharging part 21, there is a possibility that the mist M of the flocculation agent adheres to the head surface (lower surface) of the ink head 12 (in particular, the ink head 12*a*). When the mist M of the flocculation agent adheres to the head surface of the ink head 12, flocculation of the coloring material ink occurs on the head surface, and nozzle clogging easily occurs. Therefore, the configuration and operation of the inkjet recording apparatus 110D of the fourth comparative example are not preferable.

[Main Features of Inkjet Recording Apparatus According to Each Embodiment]

The inkjet recording apparatuses 10A, 10B, 10C, and 10D according to the respective embodiments have the following features.

In the inkjet recording apparatuses 10A, 10B, 10C, and 10D according to the respective embodiments, the ink head 12 that ejects the coloring material ink and the treatment liquid head (flocculation agent head 11) that ejects the treatment liquid (flocculation agent) are mounted on the single carriage 15.

Furthermore, the inkjet recording apparatuses 10A, 10B, 10C, and 10D according to the respective embodiments are configured to discharge the ink and the treatment liquid (flocculation agent) at the end during printing.

Further, the inkjet recording apparatuses 10A, 10B, 10C, and 10D according to the respective embodiments have a configuration in which the discharging region (ink discharging part 22) of the coloring material ink and the discharging region (flocculation agent discharging part 21) of the treatment liquid (flocculation agent) are separated.

Further, the inkjet recording apparatuses 10A. 10B, 10C, and 10D according to the respective embodiments perform control so that the ink head does not pass over the treatment liquid discharging part after discharging the treatment liquid (flocculation agent) in the same scan.

Further, the inkjet recording apparatuses 10A, 10B, 10C, and 10D according to the respective embodiments have a configuration in which the discharging part of the treatment liquid (flocculation agent) is disposed on the upstream side of the printing region in the same scan.

Further, the inkjet recording apparatuses 10A, 10B, 10C, and 10D according to the respective embodiments are configured to perform the discharging of the treatment liquid at the time of turning back at the end in the backward path or the forward path.

Furthermore, the inkjet recording apparatuses 10A, 10B, 10C, and 10D according to the respective embodiments have the following features.

(1) The inkjet recording apparatuses 10A, 10B, 10C, and 10D according to the respective embodiments are inkjet recording apparatuses of a scanning type including a treatment liquid head (flocculation agent head 11) that ejects a treatment liquid (flocculation agent) having a flocculation effect on a coloring material ink and a coloring material and an ink head 12 that ejects the coloring material ink in a single carriage 15, and have a configuration in which the ink head does not pass through a treatment liquid discharging part (flocculation agent discharging part 21) after discharging the treatment liquid in the same scan.

The inkjet recording apparatuses 10A, 10B, 10C, and 10D according to the respective embodiments can reduce the adhesion of the mist M of the treatment liquid (flocculation agent) to the nozzle surface of the ink head 12. Therefore, since the coloring material ink can be suppressed from flocculation on the head surface, the occurrence of nozzle clogging can be suppressed.

(2) The inkjet recording apparatuses 10A, 10B, 10C, and 10D according to the respective embodiments have a configuration in which the discharging of the treatment liquid is performed in the backward path or at the time of turning back at the end in the main scanning direction.

The inkjet recording apparatuses 10A, 10B, 10C, and 10D according to the respective embodiments can further reduce the adhesion of the mist M of the treatment liquid (flocculation agent) to the nozzle surface of the ink head 12.

(3) The inkjet recording apparatuses 10A, 10B, and 10C according to the first to third embodiments have a configuration in which, when ejecting the treatment liquid (flocculation agent), the treatment liquid discharging part (flocculation agent discharging part 21) is on the upstream side of the printing region 20 in the main scanning direction.

The inkjet recording apparatuses 10A, 10B, and 10C according to the first to third embodiments can further reduce the adhesion of the mist M of the treatment liquid (flocculation agent) to the nozzle surface of the ink head 12.

(4) The inkjet recording apparatuses 10A and 10B according to the first and second embodiments have a configuration in which, when ejecting the treatment liquid (flocculation agent), the treatment liquid discharging part (flocculation agent discharging part 21) is on the upstream side of the ink discharging part 22 in the main scanning direction.

The inkjet recording apparatuses 10A and 10B according to the first and second embodiments can reduce adhesion of mist (not illustrated) of the coloring material ink to the nozzle surface of the ink head 12. Therefore, deterioration of print quality can be suppressed.

(5) In the inkjet recording apparatuses 10A, 10B, 10C, and 10D according to the respective embodiments, the treatment liquid discharging part (flocculation agent discharging part 21) and the ink discharging part 22 are formed by separate members.

The inkjet recording apparatuses 10A, 10B, 10C, and 10D according to the respective embodiments can suppress the occurrence of flocculation of the coloring material ink due to mixing of the treatment liquid (flocculation agent) and the coloring material ink at the treatment liquid discharging part (flocculation agent discharging part 21) or the ink discharging part 22. Furthermore, since flocculation of the coloring material ink does not occur, maintenance of the treatment liquid discharging part (flocculation agent discharging part 21) and the ink discharging part 22 can be easily performed.

(6) The inkjet recording apparatus 10A according to the first embodiment has a configuration in which the treatment liquid discharging part (flocculation agent discharging part 21) is disposed on one side of the printing region and the ink discharging part 22 is disposed on the other side.

The inkjet recording apparatus 10A according to the first embodiment can further reduce adhesion of mist (not illustrated) of the coloring material ink to the nozzle surface of the treatment liquid head (flocculation agent head 11). As a result, it is possible to suppress the coloring material ink from flocculation on the head surface of the treatment liquid head (flocculation agent head 11), and thus, it is possible to suppress the occurrence of nozzle clogging.

(7) The inkjet recording apparatuses 10A, 10B, 10C, and 10D according to the respective embodiments may be configured to determine whether or not the treatment liquid is discharged based on a predetermined condition. For example, the inkjet recording apparatuses 10A, 10B, 10C, and 10D according to the respective embodiments may be configured to determine whether or not the treatment liquid is discharged based on the duty ratio of the treatment liquid in the previous scan.

In the inkjet recording apparatuses 10A, 10B, 10C, and 10D according to the respective embodiments, since the mist M of the treatment liquid (flocculation agent) floating above the flocculation agent discharging part 21 is reduced, the adhesion of the mist M of the treatment liquid (flocculation agent) to the nozzle surface of the ink head 12 can be reduced. Therefore, since the coloring material ink can be suppressed from flocculation on the head surface, the occurrence of nozzle clogging can be suppressed.

Further, in the inkjet recording apparatuses 10A, 10B, 10C, and 10D according to the respective embodiments, in a case where whether or not the treatment liquid is discharged is determined based on the duty ratio of the treatment liquid in the previous scan, the treatment liquid (flocculation agent) dries more easily as the duty ratio is lower, and thus disposal of the treatment liquid (flocculation agent) can be encouraged as the duty ratio of the treatment liquid (flocculation agent) is lower. That is, when the duty ratio of the treatment liquid is equal to or less than an arbitrarily set threshold value, it can be treated as the presence of discharge.

(8) In the inkjet recording apparatuses 10A, 10B, 10C, and 10D according to the respective embodiments, the solid content concentration of the coloring material ink is preferably 10% or more.

The coloring material ink having a higher solid content concentration has a larger influence at the time of flocculation on the nozzle surface of the ink head 12, so the present invention is preferably applied.

As described above, according to the inkjet recording apparatuses 10A, 10B, 10C, and 10D according to the respective embodiments, it is possible to reduce the adhesion of the mist M of the treatment liquid (flocculation agent) to the ink head 12 at the time of discharging the treatment liquid. In addition, it is possible to suppress nozzle clogging due to the mist M generated at the time of discharging the treatment liquid.

Note that the present invention is not limited to the above-described embodiments, and various changes and modifications can be made without departing from the gist of the present invention.

For example, the above-described embodiments have been described in detail for easy understanding of the gist of the present invention. Therefore, the present invention is not necessarily limited to one including all the components described above. In addition, in the present invention, another component can be added to a certain component, or some components can be changed to other components. Further, in the present invention, some components can be eliminated.

[First Modification]

Figure 5:
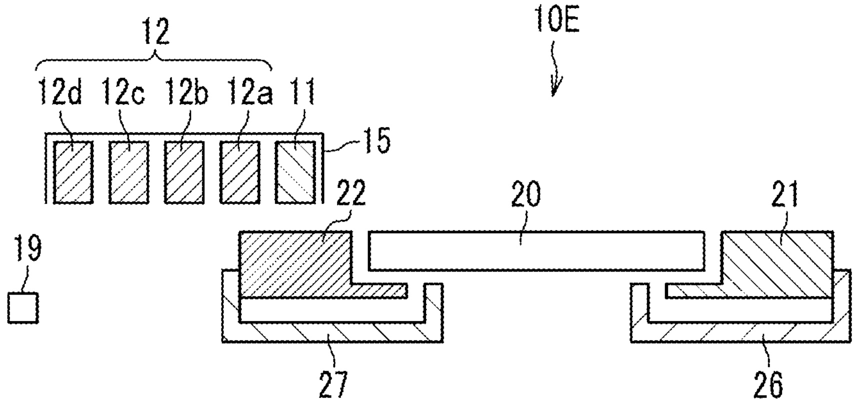
FIG. 5 is a configuration diagram of an inkjet recording apparatus according to a first modification.

For example, the inkjet recording apparatus 10A (see FIG. 1A) according to the first embodiment described above can be modified like an inkjet recording apparatus 10E of a first modification illustrated in FIG. 5. FIG. 5 is a configuration diagram of the inkjet recording apparatus 10E of the first modification.

As illustrated in FIG. 5, the inkjet recording apparatus 10E of the first modification has a configuration in which the treatment liquid discharging part (flocculation agent discharging part 21) and the ink discharging part 22 extend over the printing region 20. At least one of the treatment liquid discharging part (flocculation agent discharging part 21) and the ink discharging part 22 may extend over the printing region 20. Note that the inkjet recording apparatus according to another embodiment can be similarly modified.

In the inkjet recording apparatus 10E of the first modification, when vat-shaped storage parts 26 and 27 are disposed under the printing region 20, the discharged treatment liquid (flocculation agent) and coloring material ink can be collected by the storage parts 26 and 27. In addition, the treatment liquid discharging part (flocculation agent discharging part 21) and the storage part 26, and the ink discharging part 22 and the storage part 27 can be integrated to simplify the configuration. The storage part 26 is a component that stores a surplus of the flocculated liquid ejected to the recording medium such as the fabric or the sheet-like resin disposed on the printing region 20. The storage part 27 is a component that stores a surplus of the coloring material ink ejected to the recording medium such as the fabric or the sheet-like resin disposed on the printing region 20.

[Second Modification]

Furthermore, for example, the inkjet recording apparatus 10A (see FIG. 1A) according to the first embodiment described above can be modified like the inkjet recording apparatus 10F of the second modification illustrated in FIGS. 6A to 6H. FIGS. 6A to 6H are explanatory diagrams of the configuration and operation of the inkjet recording apparatus 10F of the second modification.

Figure 6A:
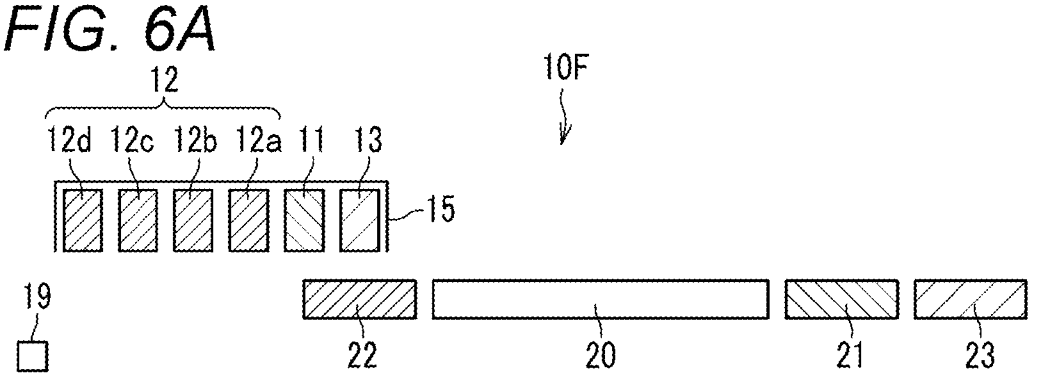
FIG. 6A is an explanatory diagram (1) of a configuration and an operation of an inkjet recording apparatus of a second modification.

As illustrated in FIG. 6A, the inkjet recording apparatus 10F of the second modification is different from the inkjet recording apparatus 10A (see FIG. 1A) according to the first embodiment in that the inkjet recording apparatus 10F of the second modification has an overcoat agent head 13 and an overcoat agent discharging part 23.

The overcoat agent head 13 is a head that ejects an overcoat agent. Unlike the flocculation agent (treatment liquid), the overcoat agent is another treatment liquid having no flocculation effect on the coloring material ink and the coloring material, and covers an image printed on a recording medium (fabric, sheet-like resin, or the like) disposed on the printing region 20 to protect the image.

The overcoat agent discharging part 23 is a part that discharges the overcoat agent. In the overcoat agent discharging part 23, a discharging member such as sponge, or cloth is disposed.

Figure 6B:
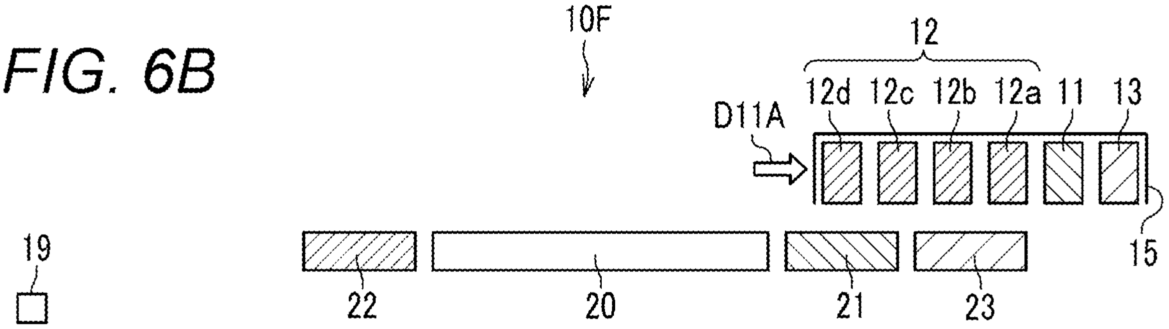
FIG. 6B is an explanatory diagram (2) of the configuration and operation of the inkjet recording apparatus of the second modification.

FIGS. 6A to 6D illustrate an operation when the flocculation agent (treatment liquid) is discharged to the flocculation agent discharging part 21. In the example illustrated in FIG. 6A, the control part 19 of the inkjet recording apparatus 10F of the second modification disposes the carriage 15 outside the region on the left side of the printing region 20. Here, as illustrated in FIG. 6B, it is assumed that the control part 19 of the inkjet recording apparatus 10F of the second modification controls the carriage 15 to move to the outside of the region on the right side of the printing region 20 in the forward path direction (see an outlined arrow D11A).

Figure 6C:
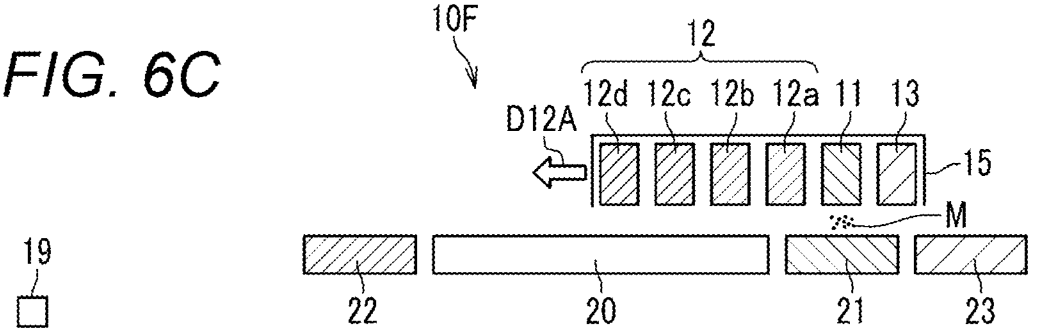
FIG. 6C is an explanatory diagram (3) of the configuration and operation of the inkjet recording apparatus of the second modification.

Next, as illustrated in FIG. 6C, it is assumed that the control part 19 of the inkjet recording apparatus 10F of the second modification controls the carriage 15 to move in the backward path direction (see an outlined arrow D12A) so that the flocculation agent head 11 is disposed above the flocculation agent discharging part 21, and further controls the flocculation agent head 11 to eject the flocculation agent toward the flocculation agent discharging part 21. At this time, the mist M of the flocculation agent floats above the flocculation agent discharging part 21.

Figure 6D:
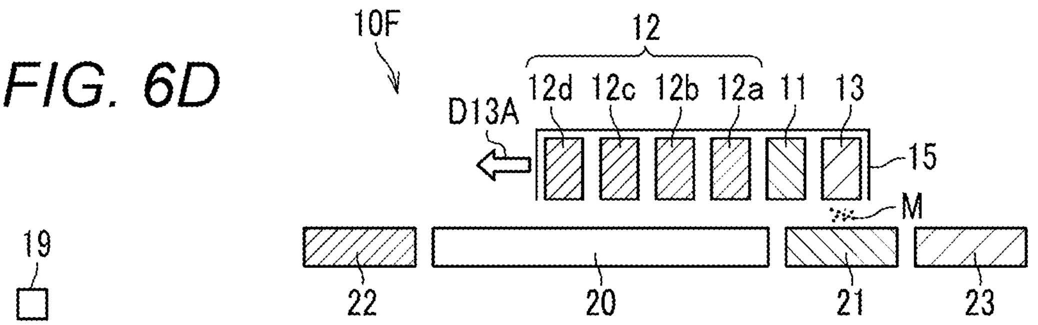
FIG. 6D is an explanatory diagram (4) of the configuration and operation of the inkjet recording apparatus of the second modification.
Figure 6E:
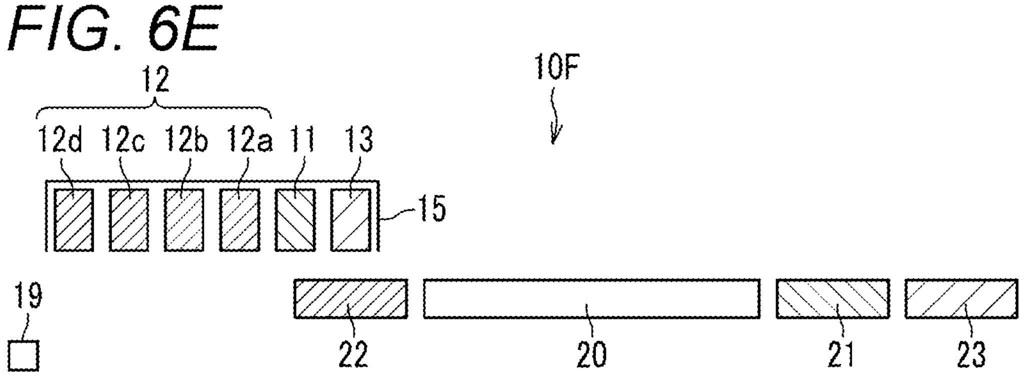
FIG. 6E is an explanatory diagram (5) of the configuration and operation of the inkjet recording apparatus of the second modification.

Next, as illustrated in FIG. 6D, it is assumed that the control part 19 of the inkjet recording apparatus 10F of the second modification performs control so as to move in the backward path direction (see an outlined arrow D13A). At this time, the overcoat agent head 13 passes over the flocculation agent discharging part 21 where the mist M of the flocculation agent is floating, but the flocculation agent does not have a flocculation effect on the overcoat agent, so that the overcoat agent head 13 does not generate nozzle clogging. At this time, since the ink head 12 does not pass over the flocculation agent discharging part 21, the inkjet recording apparatus 10F of the second modification can reduce the adhesion of the mist M of the flocculation agent to the head surface (lower surface) of the ink head 12. The inkjet recording apparatus 10F of the second modification can suppress flocculation of the coloring material ink on the head surface, and thus can suppress occurrence of nozzle clogging.

Figure 6F:
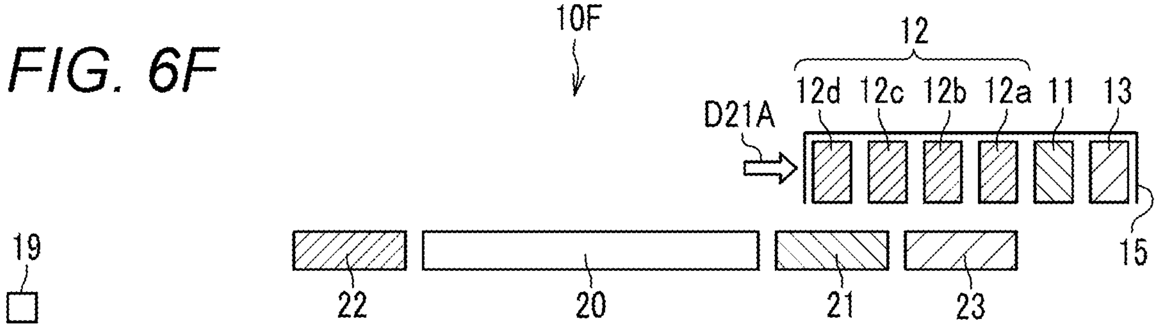
FIG. 6F is an explanatory diagram (6) of the configuration and operation of the inkjet recording apparatus of the second modification.

FIGS. 6E to 6H illustrate the operation when the overcoat agent (another treatment liquid) is discharged to the overcoat agent discharging part 23. In the example illustrated in FIG. 6E, the control part 19 of the inkjet recording apparatus 10F of the second modification disposes the carriage 15 outside the region on the left side of the printing region 20. Here, as illustrated in FIG. 6F, it is assumed that the control part 19 of the inkjet recording apparatus 10F of the second modification controls the carriage 15 to move to the outside of the region on the right side of the printing region 20 in the forward path direction (see an outlined arrow D21A).

Figure 6G:
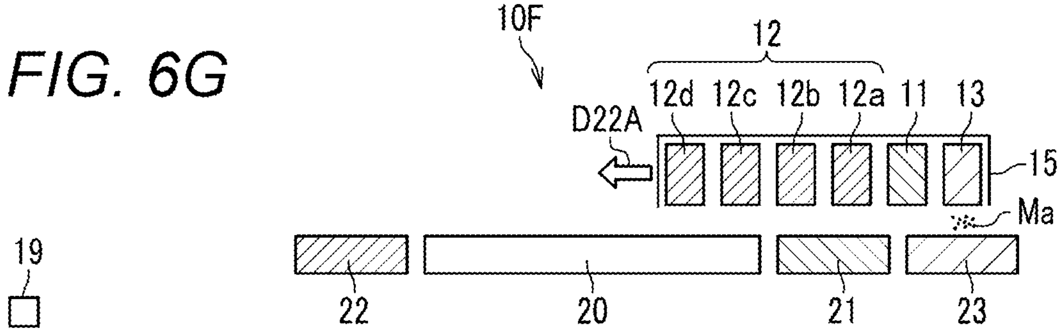
FIG. 6G is an explanatory diagram (7) of the configuration and operation of the inkjet recording apparatus of the second modification.

Next, as illustrated in FIG. 6G, it is assumed that the control part 19 of the inkjet recording apparatus 10F of the second modification controls the carriage 15 to move in the backward path direction (see an outlined arrow D22A) so that the overcoat agent head 13 is disposed above the overcoat agent discharging part 23, and further controls the overcoat agent head 13 to eject the overcoat agent toward the overcoat agent discharging part 23. At this time, the mist Ma of the overcoat agent floats above the overcoat agent discharging part 23.

Figure 6H:
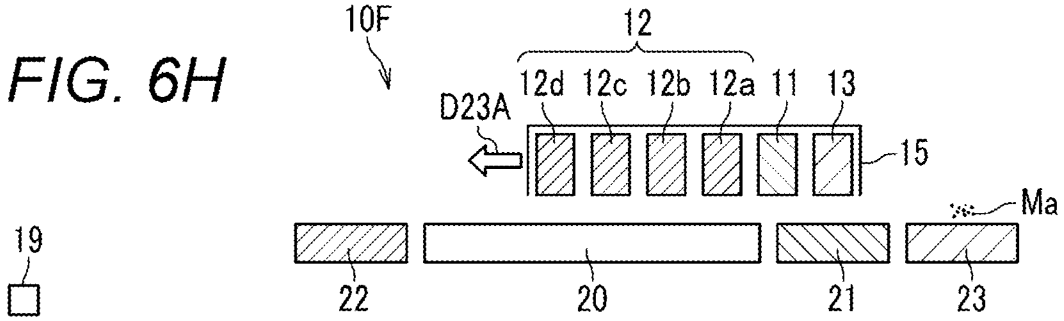
FIG. 6H is an explanatory diagram (8) of the configuration and operation of the inkjet recording apparatus of the second modification.

Next, as illustrated in FIG. 6H, it is assumed that the control part 19 of the inkjet recording apparatus 10F of the second modification is controlled to move in the backward path direction (see an outlined arrow D23A). At this time, since the ink head 12 does not pass over the flocculation agent discharging part 21, the inkjet recording apparatus 10F of the second modification can reduce the adhesion of the mist M of the flocculation agent to the head surface (lower surface) of the ink head 12. The inkjet recording apparatus 10F of the second modification can suppress flocculation of the coloring material ink on the head surface, and thus can suppress occurrence of nozzle clogging.

The inkjet recording apparatus 10F of the second modification is configured to perform inkjet printing with another treatment liquid (overcoat agent) different from the treatment liquid (flocculation agent) and having no flocculation effect on the coloring material ink and the coloring material and discharge the other treatment liquid in the same manner as the coloring material ink. Note that the inkjet recording apparatus according to another embodiment can be similarly modified.

The inkjet recording apparatus can suppress the influence of the mist M of the flocculation agent (treatment liquid) even when the inkjet recording apparatus is mounted with the overcoat agent head 13 that ejects the overcoat agent (other treatment liquid) as in the inkjet recording apparatus 10F of the second modification.

Although embodiments of the present invention have been described and illustrated in detail, the disclosed embodiments are made for purposes of illustration and example only and not limitation. The scope of the present invention should be interpreted by terms of the appended claims.

What is claimed is:

1. An inkjet recording apparatus of a scanning type comprising:

a treatment liquid head that ejects a treatment liquid having a flocculation effect on a coloring material included in a coloring material ink on a recording medium;

an ink head that ejects the coloring material ink;

a carriage in which the treatment liquid head and the ink heard are provided, wherein the ink head does not pass through a position in the inkjet recording apparatus where the treatment liquid head has discharged the treatment liquid after the treatment liquid head has discharged the treatment liquid in a same scan.

2. The inkjet recording apparatus according to claim 1, wherein the treatment liquid is discharged in a backward path or at a time of turning back at an end in a main scanning direction.

3. The inkjet recording apparatus according to claim 1, wherein the treatment liquid head is located on an upstream side of a printing region in a main scanning direction.

4. The inkjet recording apparatus according to claim 3, wherein the treatment liquid head is located on an upstream side of the ink head in the main scanning direction.

5. The inkjet recording apparatus according to claim 4, wherein the treatment liquid head and the ink head are formed by separate members.

6. The inkjet recording apparatus according to claim 5, wherein the treatment liquid head is disposed on one side of the printing region, and the ink head is disposed on another side of the printing region.

7. The inkjet recording apparatus according to claim 6, wherein at least one of the treatment liquid head and the ink head extends over the printing region.

8. The inkjet recording apparatus according to claim 1, wherein whether or not the treatment liquid is discharged is determined based on a predetermined condition.

9. The inkjet recording apparatus according to claim 8, wherein whether or not the treatment liquid is discharged is determined based on a duty ratio of the treatment liquid in a previous scan.

10. The inkjet recording apparatus according to claim 1, wherein another treatment liquid different from the treatment liquid and having no flocculation effect on the coloring material is printed by inkjet, and the another treatment liquid is discharged in a same manner as the coloring material ink.

11. The inkjet recording apparatus according to claim 1, wherein a solid content concentration of the coloring material ink is 10% or more.

12. A non-transitory recording medium storing a computer readable program for causing a control part of an inkjet recording apparatus of a scanning type including: a treatment liquid head that ejects a treatment liquid having a flocculation effect on a coloring material included in a coloring material ink on a recording medium; an ink head that ejects the coloring material ink; and a carriage in which the treatment liquid head and the ink head are provided to perform:

controlling the ink head such that the ink head does not to pass through a position in the inkjet recording apparatus where the treatment liquid head has discharged the treatment liquid in a same scan.

* * * * *